(12) United States Patent
Camilo-Martinez et al.

(10) Patent No.: US 9,382,958 B2
(45) Date of Patent: Jul. 5, 2016

(54) DISC BRAKE

(71) Applicant: KNORR-BREMSE Systeme fuer Nutzfahrzeuge GmbH, Munich (DE)

(72) Inventors: Jose Camilo-Martinez, Unterhaching (DE); Wolfgang Pritz, Munich (DE); Martin Mack, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/574,544

(22) Filed: Dec. 18, 2014

(65) Prior Publication Data

US 2015/0101893 A1 Apr. 16, 2015

Related U.S. Application Data

(63) Continuation of application No. PCT/EP2013/063512, filed on Jun. 27, 2013.

(30) Foreign Application Priority Data

Jun. 28, 2012 (DE) .......................... 10 2012 012 831

(51) Int. Cl.
*F16D 65/18* (2006.01)
*F16D 65/00* (2006.01)
(Continued)

(52) U.S. Cl.
CPC .......... *F16D 65/0068* (2013.01); *F16D 55/225* (2013.01); *F16D 65/183* (2013.01); *F16D 55/227* (2013.01); *F16D 55/228* (2013.01);
(Continued)

(58) Field of Classification Search
CPC ... F16D 55/226; F16D 55/227; F16D 55/228; F16D 55/30; F16D 55/2265; F16D 55/2255; F16D 65/183; F16D 65/568; F16D 2125/585; F16D 2125/08
See application file for complete search history.

(56) References Cited

U.S. PATENT DOCUMENTS 5,568,845 A 10/1996 Baumgartner et al.
6,405,836 B1 * 6/2002 Rieth ...................... F16D 65/18
188/158

(Continued)

FOREIGN PATENT DOCUMENTS

DE 42 17 983 A1 1/1993
DE 43 34 914 A1 4/1995
(Continued)

OTHER PUBLICATIONS

International Search Report dated Sep. 25, 2013 with English translation (seven (7) pages).

(Continued)

*Primary Examiner* — Thomas Irvin
(74) *Attorney, Agent, or Firm* — Crowell & Moring LLP

(57) ABSTRACT

A disc brake includes a brake caliper, in which two brake pads can be pressed against a brake disc when in operation. A brake pad on the action side is actuatable via a brake plunger of a brake application device. The brake plunger is led through an opening of a closure cover that closes a receiving chamber of the brake caliper. A bellows rests against the brake plunger and, on the other side, against the closure cover to seal the receiving chamber. A secondary seal is retained on the closure cover, which secondary seal is arranged concentrically to the bellows and rests against the brake plunger. The secondary seal is configured to rest slidingly against the brake plunger.

12 Claims, 2 Drawing Sheets

(51) Int. Cl.
  *F16D 55/225* (2006.01)
  *F16D 125/58* (2012.01)
  *F16D 55/227* (2006.01)
  *F16D 55/30* (2006.01)
  *F16D 65/56* (2006.01)
  *F16D 55/2265* (2006.01)
  *F16D 55/228* (2006.01)
  *F16D 121/14* (2012.01)
  *F16D 125/12* (2012.01)
  *F16D 125/08* (2012.01)
  *F16D 55/00* (2006.01)

(52) U.S. Cl.
  CPC ............. *F16D 55/2265* (2013.01); *F16D 55/30* (2013.01); *F16D 65/568* (2013.01); *F16D 2055/0016* (2013.01); *F16D 2121/14* (2013.01); *F16D 2125/08* (2013.01); *F16D 2125/12* (2013.01); *F16D 2125/585* (2013.01)

(56) References Cited

U.S. PATENT DOCUMENTS

| | | | | |
|---|---|---|---|---|
| 6,585,086 B2* | 7/2003 | Ortegren | ............... | F16D 65/183 188/71.1 |
| 6,668,981 B2* | 12/2003 | Ortegren | ............... | F16D 55/225 188/71.8 |
| 7,086,504 B2* | 8/2006 | Baumgartner | ...... | F16D 55/2255 188/196 BA |
| 7,134,532 B2* | 11/2006 | Baumgartner | ...... | F16D 55/2255 188/71.7 |
| 7,182,184 B2* | 2/2007 | Baumgartner | ........ | F16D 55/225 188/1.11 L |
| 7,182,185 B2* | 2/2007 | Baumgartner | ...... | F16D 55/2255 188/156 |
| 7,267,207 B2* | 9/2007 | Fischer | ................ | F16D 55/226 188/72.1 |
| 7,331,431 B2* | 2/2008 | Fischer | ................ | F16D 65/183 188/196 D |
| 7,374,026 B2* | 5/2008 | Taylor | ................... | F16D 65/183 188/1.11 E |
| 8,286,759 B2* | 10/2012 | Baumgartner | ........ | B60T 17/088 188/71.7 |
| 8,387,761 B2* | 3/2013 | Siebke | .................... | F16D 65/18 188/264 G |
| 8,403,114 B2* | 3/2013 | Falter | ...................... | F16D 65/00 188/71.7 |
| 2004/0050630 A1 | 3/2004 | Baumgartner et al. | | |
| 2010/0314205 A1* | 12/2010 | Falter | ...................... | F16D 65/00 188/71.7 |
| 2011/0147139 A1* | 6/2011 | Baumgartner | ........ | B60T 17/088 188/72.1 |
| 2011/0233013 A1 | 9/2011 | Siebke | | |
| 2015/0184708 A1* | 7/2015 | Camilo-Martinez | ... | F16D 65/18 188/71.8 |

FOREIGN PATENT DOCUMENTS

| | | |
|---|---|---|
| DE | 101 39 900 A1 | 8/2004 |
| DE | 103 22 834 A1 | 12/2004 |
| DE | 10 2005 035 583 A1 | 2/2007 |
| DE | 10 2007 059 777 A1 | 6/2009 |
| EP | 1 311 773 B1 | 11/2006 |
| EP | 1 748 210 B1 | 9/2010 |
| EP | 2 431 627 A2 | 3/2012 |
| EP | 2 444 698 A1 | 4/2012 |
| EP | 2 469 118 A2 | 6/2012 |
| WO | WO 2009/074222 A2 | 6/2009 |

OTHER PUBLICATIONS

German Office Action dated Apr. 25, 2013 (eight (8) pages).

International Preliminary Report on Patentability dated Dec. 31, 2014 with English translation (11 pages).

* cited by examiner

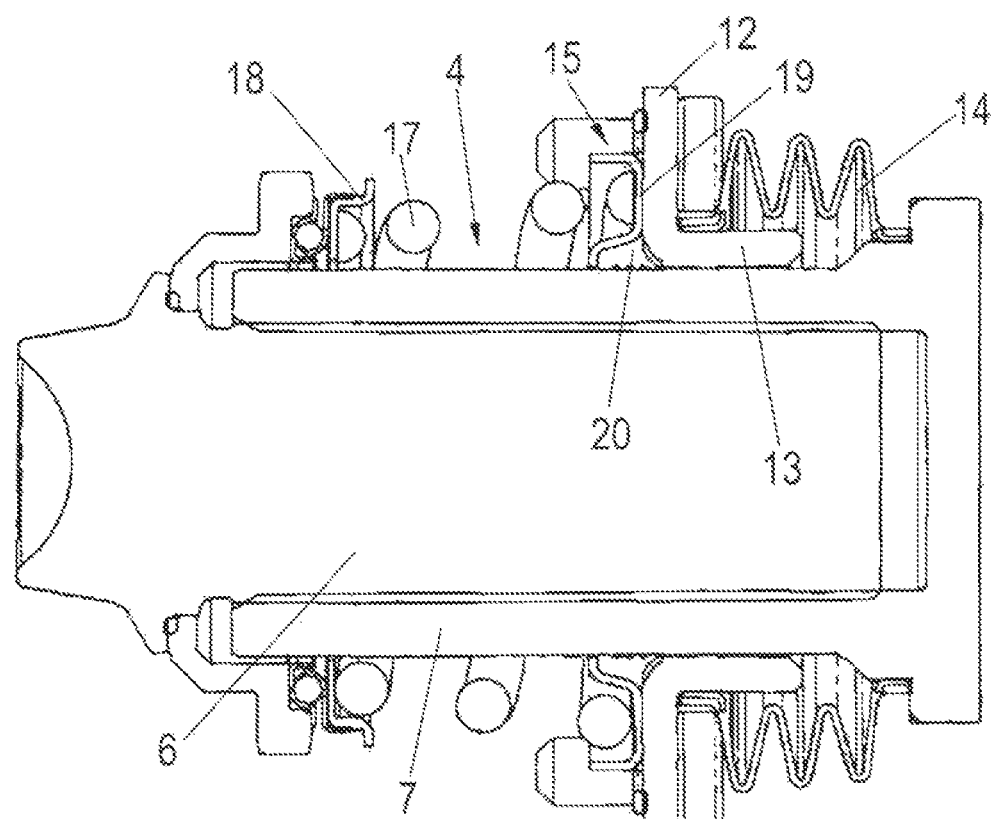
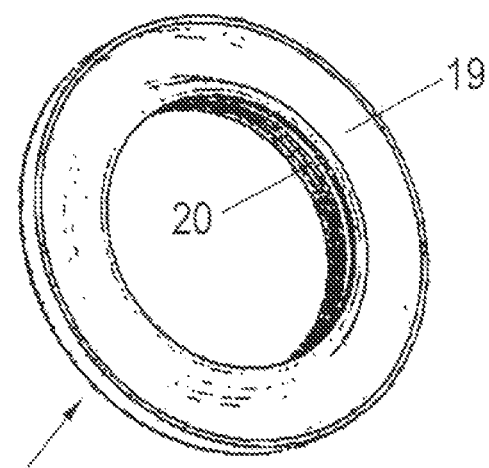
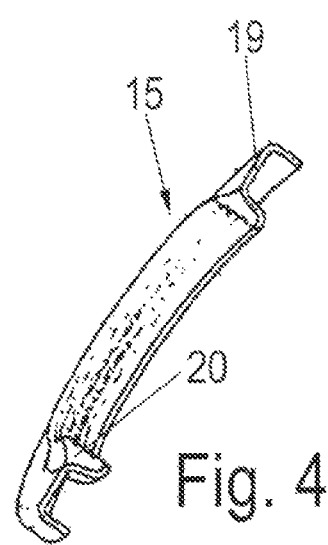

DISC BRAKE

CROSS REFERENCE TO RELATED APPLICATIONS

This application is a continuation of PCT International Application No. PCT/EP2013/063512, filed Jun. 27, 2013, which claims priority under 35 U.S.C. §119 from German Patent Application No. 10 2012 012 831.2, filed Jun. 28, 2012, the entire disclosures of which are herein expressly incorporated by reference.

BACKGROUND AND SUMMARY OF THE INVENTION

The invention relates to a disc brake having a brake caliper in which there are arranged two brake pads which, in their function, can be pressed against a brake disc. An action-side brake pad can be actuated by way of a brake-application device via at least one brake plunger. The brake plunger is guided through an opening of a closure cover which closes off a receiving chamber of the brake caliper, wherein, to seal off the receiving chamber, a corrugated bellows bears against the brake plunger and, at the other side, against the closure cover.

In order for functionally relevant components arranged in a receiving chamber of the brake caliper to be protected against corrosion owing to weather influences, an installation opening of the receiving chamber on the side assigned to the brake-application-side brake pad in the case of a sliding-caliper brake is substantially closed off by way of a closure cover.

In this case, the closure cover has openings through which brake plungers are guided, which brake plungers are pressed against the brake pad via the brake-application device during a braking operation. This functional principle is realized both in the case of a disc brake with one central brake plunger and also in the case of a disc brake with multiple, preferably two, brake plungers arranged parallel to and spaced apart from one another. For simplicity, the variant with one brake plunger will be described below.

To seal off the passage region of the brake plunger, a corrugated bellows is provided. The corrugated bellows bears sealingly at one side against the brake plunger and is fastened at the other side to the closure cover, in this case conventionally to a collar which delimits the passage opening at the boundary and which is oriented axially parallel to the brake plunger.

Furthermore, as a redundant seal element, a so-called secondary seal is provided. The secondary seal is arranged behind the corrugated bellows in the direction of the receiving chamber and, by which, the receiving chamber is protected against coarse dirt in the event of a possible failure of the corrugated bellows.

The secondary seal, which is arranged concentrically with respect to the corrugated bellows, bears firmly against the brake plunger and is held in positively locking fashion on the collar of the closure cover. For this purpose, in known constructions, corresponding recesses are provided on the collar, said recesses being engaged into by retention devices, adapted to said recesses, of the secondary seal.

However, the recesses, which are often of bead-like form, of the collar can be produced only with considerable outlay in terms of manufacturing. This is because in the case of the closure cover composed of sheet metal, they are normally formed by punching. This relatively complex bead contour opposes simple and inexpensive production, which also includes the provision of correspondingly complex tooling.

During a brake application process, the brake plunger is displaced axially, such that the secondary seal which bears firmly against it, and which, as mentioned, is held at the other side on the positionally fixed closure cover, is correspondingly deformed. To permit said deformation without damage, the secondary seal must be equipped with a so-called compensation fold, which is possible only with correspondingly high manufacturing outlay, which opposes an optimization of production costs.

Furthermore, the corrugated bellows, on the one hand, and the secondary seal, on the other hand, form an interior space. For necessary pressure equalization of said interior space with respect to the surroundings, an opening must be provided either in the secondary seal or in the corrugated bellows. The formation of the opening likewise requires high manufacturing outlay, including corresponding tooling costs. All in all, the known seal arrangement is an unsatisfactory solution for the sealing of the receiving chamber.

The invention is based on the object of further developing a disc brake of the above-mentioned type such that the secondary seal can be produced more easily and thus at lower cost, and its functional reliability can be improved.

This and other objects are achieved by a disc brake having a brake caliper in which there are arranged two brake pads which, in their function, can be pressed against a brake disc. An action-side brake pad can be actuated by way of a brake-application device via at least one brake plunger. The brake plunger is guided through an opening of a closure cover which closes off a receiving chamber of the brake caliper, wherein, to seal off the receiving chamber, a corrugated bellows bears against the brake plunger and, at the other side, against the closure cover. On the closure cover is also held a secondary seal which is arranged concentrically with respect to the corrugated bellows and which bears slidingly against the brake plunger.

By virtue of the fact that, according to the invention, the secondary seal bears slidingly against the brake plunger, the flexing described with regard to the prior art no longer occurs, which, firstly, significantly minimizes the loading of the secondary seal and, secondly, makes it possible for the secondary seal to be produced significantly more easily, in particular because the described compensation fold can be dispensed with.

In this case, the secondary seal may be composed of a rigid carrier element, for example of a sheet-metal part produced by simple deformation, into which sealing material is embedded at a corresponding location.

This sealing material performs its function even in small quantities, which, like the described simple manufacture of the carrier element, results in a reduction in production costs. As a sealing material, it is contemplated to use a commercially available, standardized O-ring, which bears against the brake plunger.

According to a further aspect of the invention, provision is made for the secondary seal to be held under spring loading against the closure cover, which may be in the form of a plate. For this purpose, for example, a helical spring may be provided which surrounds the brake plunger and which bears with one end side against the secondary seal, specifically against the support element, and with its other end side against a component connected to the brake plunger.

The compression spring may serve not only for the pressure exertion function of the secondary seal but also for the restoring movement of the brake plunger during intervals between braking operations, and, if appropriate, also for the return movement of the connected brake pad if the latter is connected in an axially secured fashion to the brake plunger.

Although it is the case here, too, that an interior space forms between the corrugated bellows and the secondary seal, pressure equalization is however achieved by virtue of the carrier element bearing indirectly, that is to say without a seal and thus not in an air-tight fashion, against the closure cover.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a sectional side view of a portion of the disc brake;
FIG. 3 is a perspective view of a detail of the disc brake;
and
FIG. 4 is a section view through the detail as per FIG. 3.

DETAILED DESCRIPTION OF THE DRAWINGS

Figure 1:
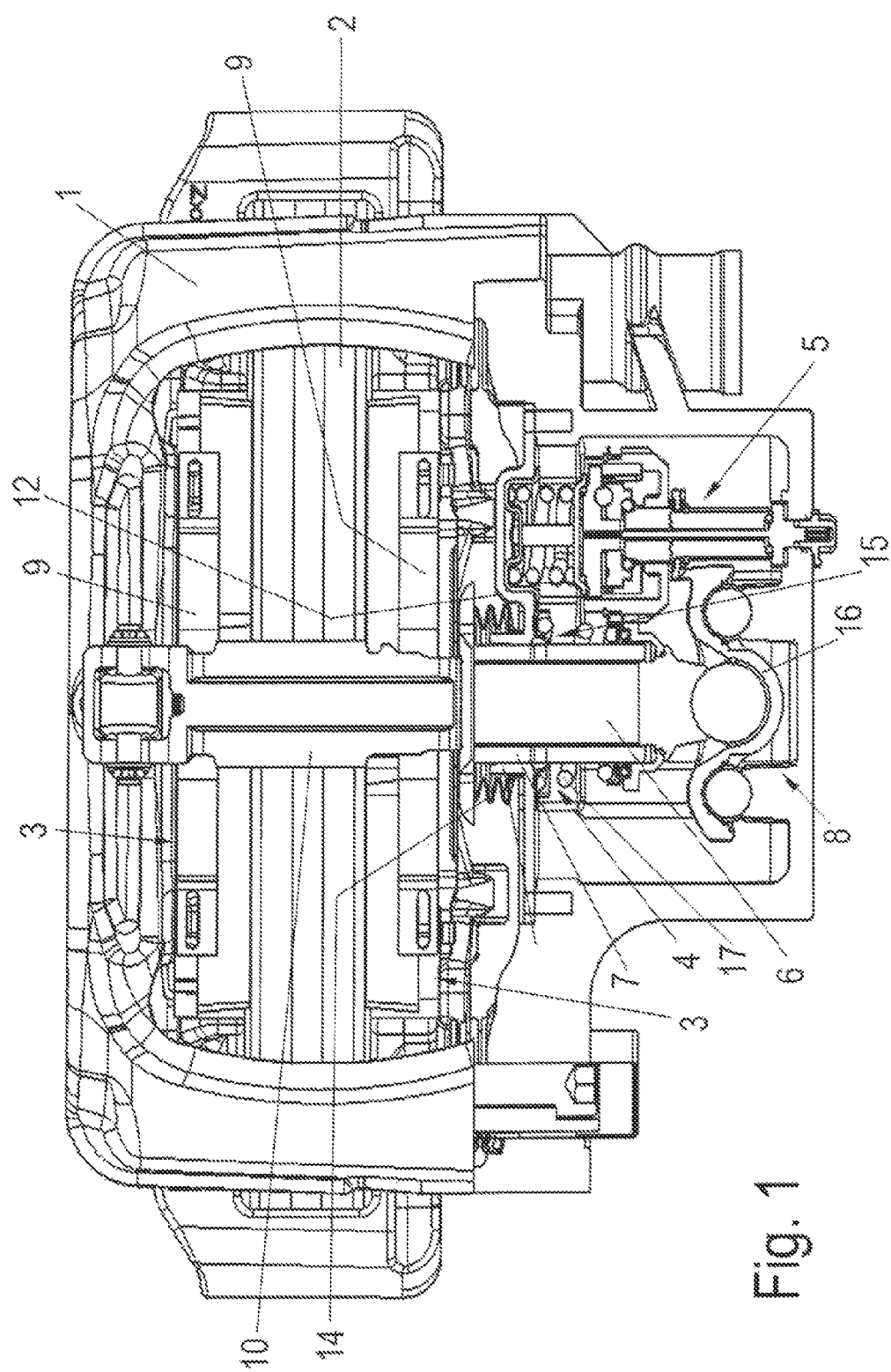
FIG. 1 is a top partially sectional plan view of a disc brake according to an embodiment of the invention.

FIG. 1 shows, in a schematic illustration, a disc brake, having a brake caliper 1 which engages over a brake disc 2 and which is in the form of a sliding caliper and in which there are arranged two brake pads 3 which, in their function, that is to say during a braking operation, can be pressed against the brake disc 2.

In this case, firstly, the brake-application-side brake pad 3 is pressed against the brake disc 2 by way of a brake-application device 8, whereas subsequently, owing to the reaction forces, the reaction-side brake pad 3 is pressed against the brake disc 2 by being driven along by the brake caliper 1 as the latter is displaced.

To each of the brake pads 3 there is fastened a pad retention spring 9 which, in interaction with a retention clip 10, holds the brake pads 3 under preload in a brake slot of the brake caliper 1 or of a brake carrier.

The brake-application device 8 has a brake plunger 4 which, arranged centrally, can be pressed in axially displaceable fashion by way of a brake lever 16 against the brake-application-side brake pad 3.

In this case, the brake plunger 4 is composed of a control spindle 6, which is connected to a wear adjustment device 5 for the compensation of an air gap, and of a sleeve 7, which engages by way of an internal thread into an external thread of the control spindle 6 and which is connected rotationally conjointly to the associated brake pad 3.

A receiving chamber, which receives the functional parts such as the brake-application device 8, the brake plunger 4 and the wear adjustment device 5, of the brake caliper 1 is closed off on the side facing toward the brake pad 3 by a closure plate 12, in order to thus protect the functional parts against weather or other external influences.

In this case, the brake plunger 4 passes through the closure plate 12 through a passage opening which is delimited circumferentially by an integrally formed collar 13. The passage opening is closed off, on the outer side facing away from the receiving chamber, by a corrugated bellows 14, which is held sealingly at one side on the collar 13 and at the other side on the brake plunger 4.

On the side situated opposite the corrugated bellows 14, that is to say the inner side of the closure cover 12, there is provided a secondary seal 15 which is shown as a detail in FIGS. 2-4.

In this case, the secondary seal 15 is composed of a carrier element 19, which is formed as a sheet-metal molded part and to which there is fastened a seal 20. The seal 20, in another design variant, may be in the form of an O-ring. The seal 20 is held in positively locking fashion in a corresponding receptacle of the carrier element 19. In any case, the seal 20, and thus the secondary seal 15 as a whole, bears slidingly and without deformation against the brake plunger 4, more specifically against the outer surface of the sleeve 7.

For retention on the closure plate 12, the carrier element 19 is pressed on by way of a compression spring 17 which, as a helical spring, surrounds the brake plunger 4. On the side situated opposite the carrier element 19, the compression spring 17 bears against a receiving part 18 which is connected to the brake plunger 4, such that, during a brake application event, in which the brake plunger 4 is moved axially, the compression spring 17 is stressed, and when the brake is released, a return movement of the brake plunger 4 is effected as a result of the relaxation of the compression spring 17.

Furthermore, for compensation of an air gap (between the brake pad and disc, particularly as the parts wear), the control spindle 6 is rotated relative to the static sleeve 7, such that said sleeve moves relative to the control spindle 6 axially in the direction of the brake pad 3.

In the example of the secondary seal 15 shown in FIGS. 3 and 4, the seal 20 is injection-molded onto the carrier element 19, which is in the form of a sheet-metal molded part, and is equipped with multiple sealing lips which make contact with the circumference of the sleeve 7. It is, however, also contemplated for the seal to be equipped with only one sealing lip.

As can be seen, the amount of material of the seal 20 is low in relation to the amount of material of the secondary seal 15 as a whole, resulting in a considerable cost saving in relation to the secondary seal according to the prior art, which is produced entirely from a sealing material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc, comprising:
   a brake caliper in which are arrangeable two brake pads that are pressed against the brake disc in use, the caliper comprising a receiving chamber;
   a brake application device having at least one brake plunger by which an action-side of one of the two brake pads is actuatable;
   a closure cover configured to close off the receiving chamber of the caliper, wherein the brake plunger is guided through an opening of the closure cover and the closure cover having an essentially planar surface facing the action-side one of the two brake pads in regions away from the closure cover opening;
   a corrugated bellows configured to seal-off the receiving chamber, one end of the corrugated bellows bearing against the brake plunger and another end against a first side of the closure cover without extending beyond the essentially planar closure cover surface toward the receiving chamber; and
   a secondary seal held on an opposite second side of the closure cover without extending to the first side of the closure cover, the secondary seal being arranged concentrically with respect to the corrugated bellows, wherein the secondary seal bears slidingly against the brake plunger.

2. The disc brake according to claim 1, wherein the secondary seal bears against the closure cover under spring loading.

3. The disc brake according to claim 2, wherein the secondary seal bears against a side of the closure cover opposite the side against which the end of the corrugated bellows bears.

4. The disc brake according to claim 3, further comprising:
a compression spring supported at one end on the secondary seal, the compression spring at another end bearing against a component part that is connected to the brake plunger.

5. The disc brake according to claim 4, wherein the secondary seal comprises a dimensionally stable carrier element and a seal held on the carrier element, the seal being configured to bear slidingly against the brake plunger.

6. The disc brake according to claim 5, wherein the carrier element is a sheet-metal molded part.

7. The disc brake according to claim 5, wherein the seal is injection-molded onto the carrier element, the seal comprising at least one sealing lip that bears slidingly against the brake plunger.

8. The disc brake according to claim 5, wherein the seal comprises an O-ring.

9. The disc brake according to claim 8, wherein the carrier element comprises a receptacle in which the O-ring is held in a positive and/or frictional locking manner.

10. The disc brake according to claim 1, wherein the secondary seal bears against a side of the closure cover opposite the side against which the end of the corrugated bellows bears.

11. The disc brake according to claim 1, further comprising:
a compression spring supported at one end on the secondary seal, the compression spring at another end bearing against a component part that is connected to the brake plunger.

12. The disc brake according to claim 1, wherein the secondary seal comprises a dimensionally stable carrier element and a seal held on the carrier element, the seal being configured to bear slidingly against the brake plunger.

* * * * *